3,110,717
PYRAZOLONE COLOUR COUPLERS FOR COLOR PHOTOGRAPHY

Colin William Greenhalgh, Swinton, Manchester, England, assignor to Ilford Limited, Ilford, England, a British company
No Drawing. Filed July 29, 1960, Ser. No. 46,114
Claims priority, application Great Britain Aug. 7, 1959
7 Claims. (Cl. 260—310)

This invention relates to colour photography and more particularly to those methods of colour photography in which a dye image is formed by reaction between the oxidation products of an aromatic primary amino developing agent, e.g. N,N-diethyl p-phenylene diamine and homologues and substitution derivatives thereof, formed during the development of a photographic silver salt image, and a colour coupler present during such development, for example in the developing solution or in the layer containing the silver salt image which is being developed.

Normally the aforesaid methods of colour photography require the development of images in the subtractive colours, yellow, magenta and cyan. In the case of the magenta dyes thus produced (with which the present invention is concerned) there is considerable difficulty in obtaining dyes of satisfactory absorption characteristics. Ideally a magenta dye should absorb all green light but transmit all red and all blue light, but in practice all known magenta dyes absorb some blue light. This is a serious disadvantage, particularly when it is required to make prints from a colour photograph containing such magenta dyes, since the action of the magenta dye in absorbing blue light which it should transmit tends to falsify the colour reproduction in the print.

Numerous methods have been devised for overcoming the difficulty by a so-called masking technique which, broadly speaking, provides for introducing a yellow (blue-absorbing) image complementary to the magenta image whereby the blue absorption of the whole layer containing the magenta image is rendered substantially uniform and accordingly without important effect on the print reproduction.

Nevertheless, the inclusion of a yellow masking image is not practical where the initial product is required to give true colour reproduction on direct viewing, and accordingly it is a matter of substantial importance to effect even a small decrease in the blue absorption of the magenta dye which is formed on colour development.

It is an object of the present invention to provide a new class of colour couplers which are characterised in that they provide, on development with the usual types of primary amino colour developing agent, magenta dyes having a reduced absorption of blue light.

According to the present invention there are provided colour couplers being compounds of the general Formula I:

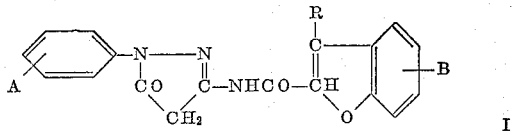
I where R represents a hydrogen atom or an alkyl group, and A and B are the same or different and each represents hydrogen or one or more substituents selected from halogen atoms (e.g. chlorine or bromine atoms), alkyl groups, alkoxy groups, carboxy groups, carbalkoxy groups and acylamido groups.

Colour couplers according to the invention are most suitable for inclusion in a developer solution when they do not contain long chain alkyl groups (i.e. groups containing 12 or more carbon atoms), and when it is intended that the colour coupler shall be used in this way it is preferred that any alkyl groups present in the substituents shall be limited to 4 carbon atoms, e.g. methyl or ethyl. Where, however, it is required that the colour couplers should be included in photographic emulsion layers, it is preferred that they contain a solubilising group, for example a carboxy group as well as groups imparting resistance to diffusion or migration in such layers, for example long chain alkyl groups, e.g. octadecyl, which may be attached either directly to the rings A and B or preferably indirectly through a linking group, for example an —NHCO— group. If desired, the carboxy and long chain alkyl groups may both be attached to the same linking group, for example a linking group of the formula

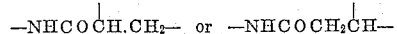

wherein the nitrogen atom is attached to the ring A or B.

The said colour couplers may be obtained by reacting a coumarilyl halide of the general formula:

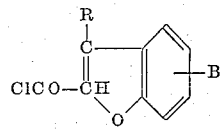

with an amine of the general formula:

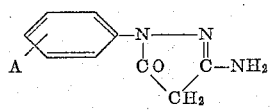

the symbols having the meanings assigned to them above.

Where products are required in which the group A is an acylamido group, these may be obtained by acylation of the corresponding products in which A is an amino group capable of acylation.

According to a further feature of the present invention there is provided a process of colour photography which comprises developing a photographic element containing a developable silver salt image by means of an aromatic primary amino developing agent in the presence of a colour coupler of general Formula I.

In one form of the said process the colour coupler may be included in the developer solution, and the present invention accordingly further includes a photographic developing composition which comprises an aromatic primary amino developing agent, a source of alkali, and a colour coupler of general Formula I.

In another form of the said process the colour coupler may be included in the photographic element and the present invention accordingly further includes a photographic element comprising at least one silver halide photographic emulsion layer containing in coactive relation with said layer a colour coupler of general Formula I. Thus the colour coupler may be included directly in a photographic emulsion layer or in a colloid layer coated adjacent thereto.

The invention further includes a photographic multilayer element which comprises, in order, a support, a silver halide emulsion layer sensitised to red or green light, a silver halide emulsion layer sensitised to green or red light but alternatively to the first-mentioned layer, and a silver halide emulsion layer sensitive to blue light, the said emulsion layer which is sensitive to red light containing a colour coupler yielding a cyan dye on colour development, the emulsion layer sensitive to green light containing a colour coupler of general Formula I in which at least one of the groups R, A and B is a long chain alkyl group, and the said emulsion layer sensitive to blue light containing a colour coupler yielding a yellow dye on colour development.

The techniques of employing colour couplers either in emulsion layers or in developing solutions is now part of the common knowledge in the art of colour photography, and the colour couplers of the present invention, of general Formula I, may be employed in accordance with any of the usual techniques. Generally the aromatic primary amino colour developer employed will be an N,N-dialkyl p-phenylene diamine or simple substitution derivative thereof, e.g. N,N-diethyl p-phenylene diamine, 2-amino-5-diethylamino toluene, or 4-amino-N-ethyl-N-ε-hydroxypentyl aniline.

The following examples will serve to illustrate the production and use of the colour couplers of this invention:

Example 1

A mixture of 17.5 parts of 1-phenyl-3-amino-5-pyrazolone, 18.5 parts of coumarilyl chloride and 70 parts of dioxan is heated at 95–100° C. for 1½ hours. After cooling the precipitated colour coupler is filtered off, washed with aqueous ethanol and recrystallised from n-propanol to give 1-phenyl-3-coumarilylamino-5-pyrazolone as cream crystals having melting point 199–200° C. On analysis the colour coupler is found to contain 67.7% of carbon, 4.3% of hydrogen and 12.9% of nitrogen ($C_{18}H_{13}O_3N_3$ requires 67.7% of carbon, 4.1% of hydrogen and 13.15% of nitrogen).

When a photographic film carrying a gelatino-silver halide emulsion is exposed and then developed in a developer solution containing the said colour coupler and 2-amino-5-diethylamino toluene and the film subsequently bleached and fixed, a magenta dye image having maximum absorption at 520 mμ is obtained.

Example 2

A mixture of 8.75 parts of 1-phenyl-3-amino-5-pyrazolone, 9.75 parts of 3-methylcoumarilyl chloride and 20 parts of dioxan is heated at 95–100° C. for 2 hours, during which time the mixture solidifies. After cooling and dilution with methanol the product is filtered off, washed with methanol and recrystallised from β-ethoxy-ethanol to give 1-phenyl-3(3'-methylcoumarilylamino)-5-pyrazolone as colourless crystals melting at 227° C. On analysis the colour coupler is found to contain 68.3% of carbon, 4.3% of hydrogen and 12.5% of nitrogen ($C_{19}H_{15}O_3N_3$ requires 68.4% of carbon, 4.5% of hydrogen and 12.6% of nitrogen).

In a colour development process carried out as described in Example 1 the colour coupler gives a magenta dye image having a maximum absorption at 528 mμ

Example 3

A mixture of 5.14 parts of 1-(4'-chlorophenyl)-3-amino-5-pyrazolone, 4.43 parts of coumarilyl chloride and 10 parts of dioxan is heated at 95–100° C. for 2 hours. After cooling the product is triturated with ether, filtered washed with ether and recrystallised first from methanol and then from dioxan to give 1-(4'-chlorophenyl)-3-coumarilylamino-5-pyrazolone as pale cream crystals having melting point 236° C. On analysis the colour coupler is found to contain 61.0% of carbon, 3.8% of hydrogen and 11.9% of nitrogen ($C_{18}H_{12}O_3N_3Cl$ requires 61.1% of carbon, 3.4% of hydrogen and 11.9% of nitrogen).

In a colour development process carried out as described in Example 1 the colour coupler yields a magenta dye image having maximum absorption at 522 mμ.

Example 4

A mixture of 8.75 parts of 1-phenyl-3-amino-5-pyrazolone, 8.98 parts of 5-chlorocoumarilyl chloride and 60 parts of dioxan is heated at 95–100° C. for 1 hour during which time the product is precipitated. After cooling the colour coupler is filtered off, washed with aqueous ethanol, then methanol and dissolved in a mixture of 100 parts of ethanol and 25 parts of 10% aqueous potassium hydroxide. The solution is treated with carbon, filtered and the filtrate acidified with acetic acid and the precipitated colour coupler filtered off, washed with methanol and dried. 1-phenyl-3-(5'-chlorocoumarilylamino)-5-pyrazolone is obtained as colourless crystals melting at 216–217° C. On analysis the colour coupler is found to contain 60.9% of carbon, 3.4% of hydrogen, 11.9% of nitrogen and 10.2% chlorine ($C_{18}H_{12}O_3N_3Cl$ requires 61.1% of carbon, 3.4% of hydrogen, 11.9% of nitrogen and 10.05% of chlorine).

In a colour development process carried out as described in Example 1 the colour coupler gives a magenta dye image having maximum absorption at 521 mμ.

Example 5

A solution of 10.34 parts of 5-methylcoumarilyl chloride in 10 parts of dioxan is added to a hot solution of 9.32 parts of 1-phenyl-3-amino-5-pyrazolone in 40 parts of dioxan and the mixture heated at 95–100° C. for 1½ hours, during which time the product separates out. After cooling the product is filtered off, washed with aqueous methanol and dried. The colour coupler is purified by first dissolving in 200 parts of ethanol and 25 parts of 10% aqueous potassium hydroxide and acidifying with acetic acid and then by recrystallising the precipitated product from 200 parts of n-propanol. 1-phenyl-3(5'-methylcoumarilylamino)5-pyrazolone is obtained as colourless flat needles melting at 202–203° C. On analysis the colour coupler is found to contain 68.6% of carbon, 4.5% of hydrogen and 12.5% of nitrogen ($C_{19}H_{15}O_3N_3$ requires 68.4% of carbon, 4.5% of hydrogen and 12.6% of nitrogen).

In a colour development process carried out as described in Example 1 the colour coupler gives a magenta dye image having maximum absorption at 517 mμ.

The 5-methylcoumarilyl chloride used in the above example may be obtained as follows:

A mixture of 10.2 parts of 5-methylcoumarilic acid, 50 parts of thionyl chloride and 0.5 part of pyridine is heated under reflux for 1 hour. The resultant solution is evaporated under reduced pressure and the residue boiled with 30 parts of benzene, filtered from insoluble material and the filtrate evaporated to dryness under reduced pressure. 5-methylcoumarilyl chloride is obtained as a colourless crystalline solid melting at 71–72° C.

5-methylcoumarilic acid itself may be obtained as follows:

10.4 parts of anhydrous potassium carbonate are added to a stirred mixture of 11.62 parts of 2-hydroxy-5-methylbenzaldehyde, 24.5 parts of diethyl bromomalonate and 50 parts of methyl ethyl ketone. The mixture is then stirred and heated under reflux for 5 hours, filtered and the residue washed well with hot methyl ethyl ketone. 31 parts of caustic liquor are then added to the combined filtrates and the solution steam distilled to remove all the solvent, the solution then being strongly acidified with hydrochloric acid. After ½ hour at 95–100° C. the resultant suspension is cooled, filtered and the acid recrystallised from 150 parts of ethanol. 5-methylcoumarilic acid is obtained as colourless plate crystals melting at 238–240° C. On analysis the acid is found to contain 68.2% of carbon and 4.6% of hydrogen ($C_{10}H_8O_3$ requires 68.15% of carbon and 4.55% of hydrogen).

Example 6

A solution of 10.42 parts of 5:7-dimethylcoumarilyl chloride in 10 parts of dioxan is added to a hot solution of 8.75 parts of 1-phenyl-3-amino-5-pyrazolone in 40 parts of dioxan and the solution obtained heated at 95–100° C. for 1½ hours during which time the product is precipitated. After cooling the product is filtered off, washed with aqueous methanol and then with methanol. The colour coupler is purified first by dissolving in 250 parts of ethanol and 30 parts of 10% aqueous potassium hydroxide and acidifying with acetic acid and then by recrystallising the precipitated product from 325 parts of n-propanol. 1 - phenyl - 3(5':7' - dimethylcoumarilylamino)-5-pyrazolone is obtained as colourless plate crystals melting at 218–220° C. On analysis the product is found to contain 69.3% of carbon, 4.7% of hydrogen and 11.8% of nitrogen ($C_{20}H_{17}O_3N_3$ requires 69.15% of carbon, 4.9% of hydrogen and 12.1% of nitrogen).

In a colour development process carried out as described in Example 1 a magenta dye image is produced with maximum absorption at 519 m$\mu$.

The 5:7-dimethylcoumarilyl chloride used in the above example may be obtained from 5:7-dimethylcoumarilic acid by the method used for 5-methylcoumarilic acid given in Example 5. The 5:7-dimethylcoumarilyl chloride obtained has M.Pt. 50–52°.

5:7 dimethylcoumarilic acid itself is obtained from 2-hydroxy-3:5-dimethylbenzaldehyde by the method used for 5-methylcoumarilic acid as given in Example 5. The 5:7-dimethylcoumarilic acid is obtained as colourless plate crystals melting at 253–254° C.

*Example 7*

A solution of 8.32 parts of 5:7-dichlorocoumarilyl chloride in 10 parts of dioxan is added to a hot solution of 5.83 parts of 1-phenyl-3-amino-5-pyrazolone in 35 parts of dioxan, the product being precipitated immediately. After heating for 1½ hours at 95–100° C. the mixture is cooled and the product filtered off, washed with aqueous methanol and then methanol. The colour coupler is purified by dissolving in 150 parts of ethanol and 25 parts of 10% aqueous potassium hydroxide and acidifying with acetic acid to give 1-phenyl-3-(5':7'-dichlorocoumarilylamino)-5-pyrazolone as pale fawn micro-crystals melting above 330° C. On analysis the colour coupler is found to contain 18.5% of chlorine ($C_{18}H_{11}O_3N_3Cl_2$ requires 18.3% of chlorine).

In a colour development process carried out as described in Example 1 the colour coupler gives a magenta dye image having maximum absorption at 520 m$\mu$.

5:7 - dichlorocoumarilyl chloride which has melting point 69–70° C. is obtained from 5:7-dichlorocoumarilic acid by the method given for 5-methylcoumarilyl chloride in Example 5. 5:7-dichlorocoumarilic acid itself is obtained as colourless plate crystals melting at 258–260° C. from 2-hydroxy-3:5-dichlorobenzaldehyde by the method used for 5-methylcoumarilic acid in Example 5. On analysis 5:7-dichlorocoumarilic acid is found to contain 29.7% of chlorine ($C_9H_4O_3Cl_2$ requires 30.75% of chlorine).

*Example 8*

A solution of 3.15 parts of 6-methoxycoumarilyl chloride in 5 parts of dioxan is added to a hot solution of 2.62 parts of 1-phenyl-3-amino-5-pyrazolone in 10 parts of dioxan. The solution obtained is heated at 95–100° C. for 1 hour when it is cooled, poured into water and the precipitated gum washed with water by decantation and then warmed with methanol, when it solidifies. The colour coupler is filtered off, dissolved in methanolic potassium hydroxide and acidified with acetic acid to give 1-phenyl 3-(6'-methoxycoumarilylamino)-5-pyrazolone as pale fawn needle crystals having melting point 190–192° C. On analysis the colour coupler is found to contain 64.6% of carbon, 4.2% of hydrogen and 11.9% of nitrogen ($C_{19}H_{15}O_4N_3$ requires 65.3% of carbon, 4.3% of hydrogen and 12.2% of nitrogen).

In a colour development process carried out as described in Example 1 the colour coupler gievs a magenta dye image having maximum absorption at 516 m$\mu$.

*Example 9*

A solution of 2,92 parts of 3-methylcoumarilyl chloride in 5 parts of dioxan is added to a hot solution of 4.2 parts of 1-2':4':6'-trichlorophenyl)-3-amino-5-pyrazolone in 15 parts of dioxan and the mixture heated at 95–100° C. for 1 hour during which time the product is precipitated. After cooling the product is filtered off, dissolved in 50 parts of ethanol and 20 parts of 10% aqueous potassium hydroxide and precipitated by acidifying with acetic acid. 1 - (2':4':6' - trichlorophenyl) - 3(3" - methylcoumarilylamino)-5-pyrazolone is obtained as colourless crystals melting at 290–292° C. On analysis the colour coupler is found to contain 51.8% of carbon, 2.8% of hydrogen, 9.3% of nitrogen and 25.1% of chlorine ($C_{19}H_{12}O_3N_3Cl_3$ requires 52.3% of carbon, 2.75% of hydrogen, 9.65% of nitrogen and 24.3% of chlorine).

In a colour development process carried out as described in Example 1 the colour coupler gives a magenta dye image having maximum absorption at 532 m$\mu$.

*Example 10*

A mixture of 4.2 parts of 1-(2':4':6'-trichlorophenyl)-3-amino-5-pyrazolone, 3.6 parts of coumarilyl chloride and 25 parts of dioxan is heated at 95–100° C. for 2 hours. The mixture is cooled, diluted with 25 parts of methanol and 10% aqueous sodium hydroxide added until just alkaline. The mixture is acidified with acetic acid and the precipitated gum triturated with aqueous methanol and then boiled with methanol when it solidifies. The 1-(2':4':6'-trichlorophenyl-3-coumarilylamino-5-pyrazolone is filtered off, washed with methanol and then ether and is obtained as a pale fawn solid melting at 284–285° C. On analysis the colour coupler is found to contain 9.6% of nitrogen and 26.3% of chlorine ($C_{18}H_{10}O_3N_3Cl_3$ requires 9.95% of nitrogen and 25.2% of chlorine).

In a colour development process carried out as described in Example 1 the colour coupler gives a magenta dye image having maximum absorption at 530 m$\mu$.

*Example 11*

A mixture of 3.34 parts of 1-(4'-aminophenyl)3-coumarilylamido-5-pyrazolone, 4.37 parts of N-n-octadecylisobutyrylaminosuccinic anhydride and 30 parts of acetic acid is heated under reflux for 30 minutes. The reaction mixture is poured into 250 parts of water and the precipitated product filtered off, washed with water and dried. Recrystallisation from a mixture of benzene and a petroleum ether fraction boiling between 60° and 80° C. gives 1(4[$\beta$(N - n - octadecylisobutyrylamino) - $\beta$ - carboxypropionylamino]phenyl)3 - coumarilylamino - 5 - pyrazolone and/or 1(4[$\alpha$-(N-n-octadecylisobutyrylamino)-$\beta$-carboxypropionylamino]phenyl)-3-coumarilylamino-5-pyrazolone as fawn coloured micro crystals melting at 142° C. with decomposition above 160° C.

The 1(4' - aminophenyl)-3-coumarilylamino-5-pyrazolone used in the above example may be prepared in the following manner:

A solution of 44 parts of coumarilyl chloride in 50 parts of dioxan is added to a stirred suspension of 54 parts of 1-(4'-nitrophenyl)-3-amino-5-pyrazolone in 175 parts of dioxan at 100° C. The reaction mixture is stirred and heated at 100° C. for 10 minutes during which time 1-(4'-nitrophenyl)-3-coumarilylamino-5-pyrazolone is precipitated. After cooling, the reaction mixture is diluted with 250 parts of 50% aqueous methanol and the nitro compound filtered off, washed successively with aqueous methanol, methanol and ether. Recrystallisation from dioxan gives the nitro compound as yellow crystals melting at 276–278° C. with decomposition.

40 parts of the nitro compound in 800 parts of n-propanol is hydrogenated at 60–70° C. and a pressure of 60 atmospheres using Raney nickel as catalyst. The amine obtained is recrystallised from n-propanol to give 1-(4'-aminophenyl)-3-coumarilylamino-5-pyrazolone as fawn coloured crystals melting at 232–233° C. On analysis the amine is found to contain 64.2% of carbon, 4.2% of hydrogen and 16.9% of nitrogen ($C_{18}H_{14}O_3N_4$ requires 64.7% of carbon, 4.2% of hydrogen and 16.75% of nitrogen).

The N-n-octadecylisobutyrylaminosuccinic anhydride also used in the above example may be prepared as in Example 25 of the British Patent No. 830,797.

*Example 12*

In place of the 4.37 parts of N-n-octadecylisobutyrylaminosuccinic anhydride used in Example 11 there are used 3.26 parts of stearoylaminosuccinic anhydride. The reaction mixture is poured into 100 parts of water and the precipitated colour coupler washed with water, dried and recrystallised from methanol. The colour coupler, which consists of 1-[4'-(β-stearoylamino-β-carboxypropionylamino)phenyl]-3-coumarilylamino - 5 - pyrazolone and/or 1-[4'-(α-stearoylamino-β - carboxypropionylamino)phenyl]-3-coumarilylamino-5-pyrazolone is obtained as colourless micro crystals melting at 179–180° C. and on analysis is found to contain 66.4% of carbon, 6.8% of hydrogen and 9.9% of nitrogen. ($C_{40}H_{55}O_7N_5$ requires 67.0% of carbon, 7.55% of hydrogen and 9.75% of nitrogen.)

The stearolyaminosuccinic anhydride used in the above example may be prepared according to the conditions given in Example 1 of British Patent No. 830,797.

A photographic emulsion layer containing the colour coupler may be obtained in the following manner:

1.5 parts of 2 N potassium hydroxide solution is added to a suspension of 1.11 parts of the colour coupler in 9 parts of methanol. The mixture is warmed and the solution obtained diluted to 19 parts with distilled water. The colour coupler solution is added to 460 parts of a green-sensitised gelatin silver halide emulsion and the emulsion coated on to a film base and the coated layer dried. When the photographic material so obtained is exposed to green light, developed in a colour developer containing 4-amino-N-ethyl-N-ε-hydroxy pentylaniline, bleached and fixed, a magenta dye image is obtained which has an absorption maximum at a wavelength of light of 522 millimicrons.

*Example 13*

A mixture of 4.94 parts of 1-(4'-carbethoxyphenyl)-3-amino-5-pyrazolone, 4.3 parts of 5-chlorocoumarilyl chloride and 20 parts of dioxan is heated at 95–100° C. for 1½ hours during which time the mixture solidifies. After cooling and dilution with 50% aqueous ethanol the product is filtered off, washed with 50% aqueous ethanol, methanol, then ether and dried. The colour coupler is dissolved in a mixture of 90 parts of ethanol and 20 parts of 2 N potassium hydroxide solution, the solution filtered and the filtrate acidified with acetic acid. The precipitated colour coupler is filtered off, washed with methanol, then ether and dried to give 1-(4'-carbethoxyphenyl) - 3-(5'-chlorocoumarilylamino)-5-pyrazolone as colourless crystals melting at 220–222° C. On analysis the colour coupler is found to contain 59.5% of carbon, 3.5% of hydrogen and 9.4% of nitrogen ($C_{21}H_{16}O_5N_3Cl$ requires 59.3% of carbon, 3.75% of hydrogen and 9.9% of nitrogen).

The 1 - (4' - carbethoxyphenyl)-3-amino-5-pyrazolone used in the above example may be prepared according to the conditions given in Example 18 of British Patent No. 830,797.

In a colour development process carried out as described in Example 1 the colour coupler gives a magenta dye image having a maximum absorption at 535 mμ.

*Example 14*

10 parts of acetic anhydride is added to a solution of 3.6 parts of 1-(4'-aminophenyl)-3-coumarilylamino-5-pyrazolone in 30 parts of acetic acid. The solution is heated at 100° C. for 20 minutes, poured into water and the precipitated product filtered off, and washed successively with water, methanol and diethyl ether. The colour coupler is dissolved in a mixture of 25 parts of methanol and 5 parts of 2 N potassium hydroxide solution and the solution obtained decolourised with activated carbon. After filtering the solution is acidified with acetic acid and the precipitated 1(4'-actylaminophenyl)-3-coumarilyl amino-5-pyrazolone filtered off, washed with methanol and ether and then dried. The colour coupler is obtained as a fawn coloured solid melting at 222° C. and on analysis is found to contain 63.2% of carbon, 4.5% of hydrogen and 15.0% of nitrogen ($C_{20}H_{16}O_4N_4$ requires 63.9% of carbon, 4.25% of hydrogen and 14.9% of nitrogen).

In a colour development process carried out as described in Example 1 the colour coupler gives a magenta dye image having a maximum absorption at 532 mμ.

A convenient measure of the extent to which a magenta dye absorbs blue light is obtained by drawing an absorption curve of wave-length as abscissa against density as ordinate, the densities being adjusted to $D_{max}=1.0$, and noting the total size of the area which lies below the curve over the region 400 to 480 mμ. The figures for blue absorption which are given below are derived in this way. The blue absorption values for the magenta dyes obtained according to the foregoing examples are as follows:

| Example: | Blue-absorption value |
|---|---|
| 1 | 7.5 |
| 2 | 8.0 |
| 3 | 8.5 |
| 4 | 8.25 |
| 5 | 8.3 |
| 6 | 8.3 |
| 7 | 8.5 |
| 8 | 9.15 |
| 9 | 8.75 |
| 10 | 9.3 |
| 13 | 8.1 |
| 14 | 8.7 |

Against these, for comparison, it may be noted that the colour couplers listed below, which are closely related chemically, all colour developed analogously using the same colour developer, give substantially higher figures.

| Colour Coupler | Blue-absorption value |
|---|---|
| A. 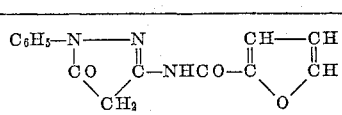 | 11.0 |
| B. 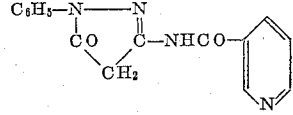 | 10.4 |
| C. 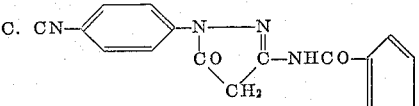 | 16.0 |
| D. 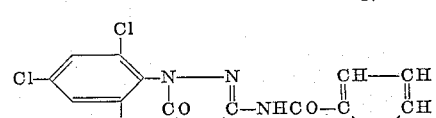 | 16.2 |
| E. 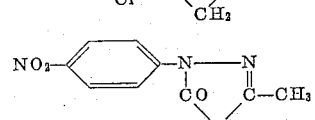 | 15 |

The best of these is worse than the least effective of the compounds of the present invention, and though the difference in that case appears small in the numerical values given, it is nevertheless a difference of real importance from the standpoint of accuracy of colour reproduction.

It is to be understood that the present invention includes the colour couplers of the general formula set forth herein, their production, colour photographic materials and developers containing them, and processes of colour photography based on their use.

What I claim is:

1. Colour couplers for use in colour photography, having the formula:

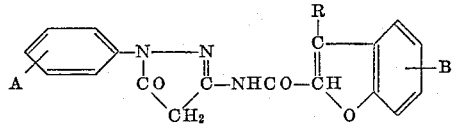

wherein R is selected from the class consisting of the hydrogen atom and alkyl groups, and A and B are each selected from the class consisting of hydrogen, halogen, alkyl, alkoxy, carboxy, carbalkoxy and alkanoylamino, alkylamino $\beta$-carboxy propionylamino and alkyl, lower alkanoyl amino $\beta$-carboxy propionylamino.

2. The colour coupler 1-phenyl-3-coumarilylamino-5-pyrazolone.

3. The colour coupler 1-phenyl-3(5'-methylcoumarilylamino)-5-pyrazolone.

4. The colour coupler 1-(2',4',6'-trichlorophenyl)-3(3''-methylcoumarilylamino)-5-pyrazolone.

5. The colour coupler 1-(2',4',6'-trichlorophenyl)-3-coumarilylamino-5-pyrazolone.

6. The colour coupler 1(4[(N-n-octadecylisobutyrylamino)-$\beta$-carboxypropionylamino]phenyl)-5-coumarilylamino-5-pyrazolone, obtained by the reaction of 1-(4-aminophenyl)-3-coumarilylamido-5-pyrazolone with N-n-octadecylisobutylrylaminosuccinic anhydride.

7. The colour coupler 1-[4'-(stearoylamino-$\beta$-carboxypropionylamino)phenyl]-3-coumarilylamino-5-pyrazolone, obtained by the reaction of 1-(4'-aminophenyl)-3-coumarilylamido-5-pyrazolone with stearoylaminosuccinic anhydride.

References Cited in the file of this patent

UNITED STATES PATENTS

| | | |
|---|---|---|
| 2,865,751 | Feniak et al. | Dec. 23, 1958 |
| 2,895,825 | Pelz et al. | July 21, 1959 |
| 2,878,263 | Oroshnik | Mar. 17, 1959 |
| 2,902,366 | Sprung et al. | Sept. 1, 1959 |
| 2,903,461 | Smith | Sept. 8, 1959 |

OTHER REFERENCES

Elderfield: "Heterocyclic Compounds," volume 5, pages 132, 150 (1957).